UNITED STATES PATENT OFFICE.

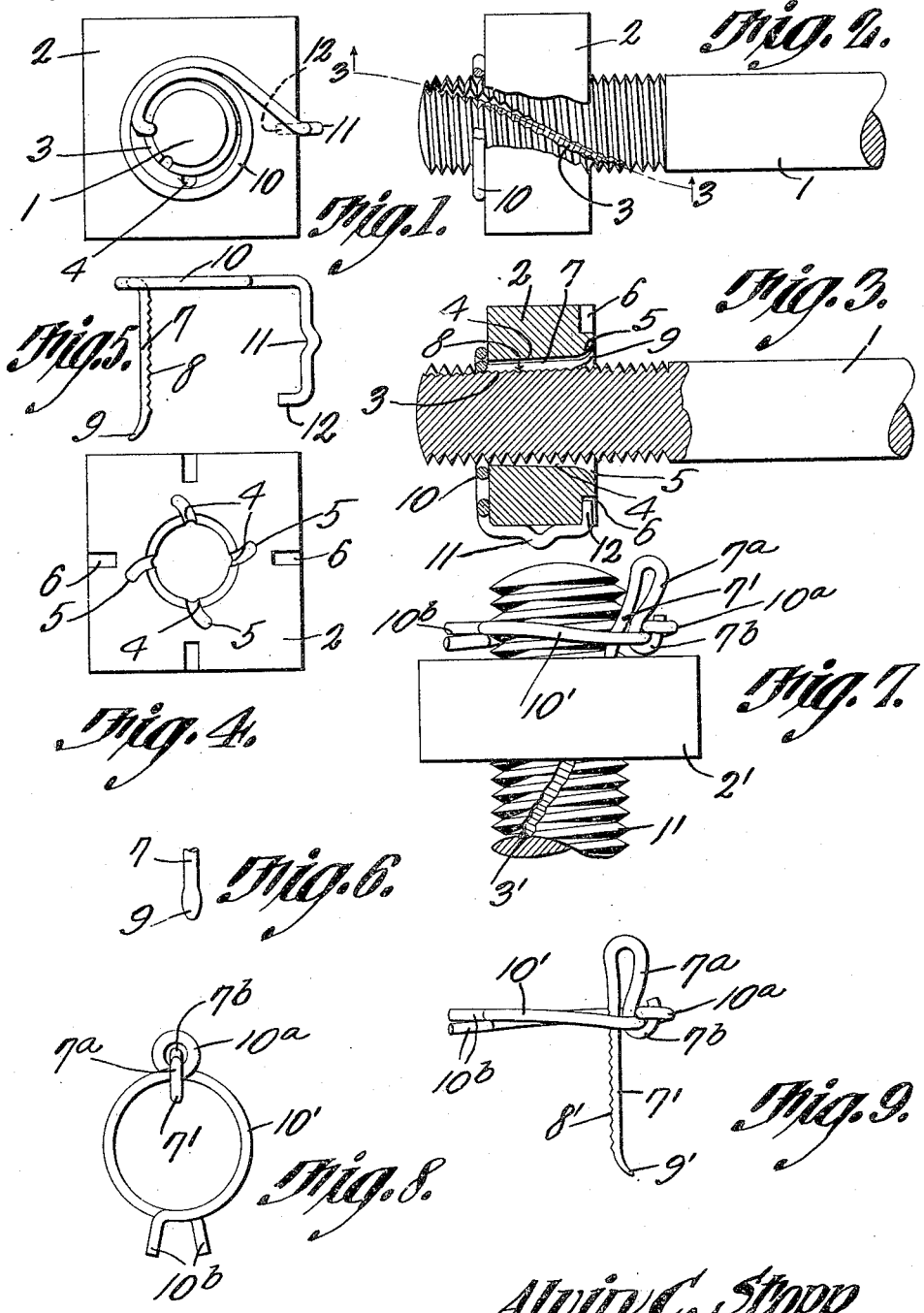

ALVIN C. STOPP, OF STOPPINGTON, ALBERTA, CANADA.

NUT-LOCK.

1,124,355.	Specification of Letters Patent.	Patented Jan. 12, 1915.

Application filed October 29, 1913.   Serial No. 798,142.

*To all whom it may concern:*

Be it known that I, ALVIN C. STOPP, a citizen of the United States, residing at Stoppington, in the Province of Alberta and Dominion of Canada, have invented a new and useful Nut-Lock, of which the following is a specification.

The present invention appertains to nut locks, and aims to provide a unique means for locking a nut upon a bolt, which locking means will be thoroughly feasible or practical, as well as convenient and effective in use.

Another object of the present invention is to provide in combination with a bolt and nut having registrable grooves, a locking device including a key insertible into the grooves of the bolt and nut when they are brought into register, the parts being so proportioned or constructed as to permit the key to be readily applied to and removed from the nut and bolt, and in order that when the key is applied to the nut and bolt, there will be no liability for the same to be accidentally displaced or removed.

As a further object, the present invention contemplates the provision of a device of the nature indicated, which shall be comparatively simple, substantial and inexpensive in construction, and which may be readily and cheaply manufactured from wire stock.

With the foregoing general objects outlined, and with other objects in view, which will be apparent as the nature of the invention is better understood, the present invention resides in the combination and arrangement of parts and in the details of construction hereinafter described and claimed, it being understood that changes in the precise embodiment of the invention herein disclosed, can be made within the scope of what is claimed, without departing from the spirit of the invention.

The invention has been illustrated in its preferred embodiments in the accompanying drawing, wherein:—

Figure 1 is an end view of a bolt having a nut threaded thereon, with the present locking device applied thereto, the face of the nut being shown. Fig. 2 is a side elevation of the parts depicted in Fig. 1, portions being broken away. Fig. 3 is a sectional view taken on the line 3—3 of Fig. 2, the grooves of the bolt and nut, as well as the key, being slightly distorted for purpose of clearness, or being illustrated as extending longitudinally instead of spirally. Fig. 4 is a back view of the nut. Fig. 5 is a side elevation of the improved locking device. Fig. 6 is a detail view of the tip of the key. Fig. 7 is a side elevation of a nut and bolt embodying a modified form of locking device. Fig. 8 is a plan view of the modified form of locking device illustrated in Fig. 7. Fig. 9 is a side elevation of the locking device depicted in Fig. 8.

Referring specifically to Figs. 1 to 6, inclusive, wherein one form of the invention is illustrated, the bolt and nut have been designated by the numerals 1 and 2 respectively, it being understood that these elements may be of various proportions, such as are in common use. In carrying out the present invention, the threaded end of the bolt 1 is provided with a spiral groove or channel 3 of much greater pitch than the threads, and which forms a key seat. The groove or key seat 3 is deepest at its outer end, and grows shallower toward its inner end, and it is also preferable to provide the bottom of the groove or key seat 3 with a longitudinal series of transverse corrugations as illustrated. The threaded bore of the nut is provided with a plurality of spiral grooves or channels 4 of a pitch similar to the pitch of the groove or key seat 3 of the bolt, the grooves or keyways 4 of the nut being adapted to register with the groove or key seat 3. The grooves or keyways 4 of the nut are comparatively shallow at the face of the nut, and grow deeper toward the back of the nut, and at the back of the nut, the inner ends of the grooves or keyways 4 diverge to provide the notches or kerfs 5. The grooves or keyways 4 of the nut are preferably smooth throughout. The back of the nut is also provided with a series of marginal notches or recesses 6, preferably one to each side of the nut.

The locking device, which is illustrated in side elevation in Fig. 5, is bent from a length of suitable resilient or flexible wire. One end portion of the wire forms a key 7, one side of which has a longitudinal series of transverse corrugations as at 8, and the tip of which is flattened and curved, as at 9. The wire is bent from the butt end of the key 7 into a spiral coil 10, and from the outer end of the coil 10, the wire is bent angularly into a retaining finger 11, the tip 12 of which is bent angularly inward.

The key 7 is flexible or resilient, and is adapted to be inserted into the key seat 3 and the registering keyway 4, from the face of the nut inward, the coil 10 being arranged to seat against the face of the nut so as to encompass or surround the bolt, and the retaining finger 11 being designed to engage over one side of the nut in order that its angular tip 12 may engage the respective notch or recess 6 to hold the coil 10 in place against the face of the nut. When the tip 9 of the key is inserted into the registering key seat and key groove of the bolt and nut, the same will be flexed approximately into the axis of the body of the key, and as the key is forced inward, the same will be flexed or bent spirally so as to follow the key seat and groove. This will create a tension upon the key, tending to hold it in place, and the corrugations or teeth 8 of the key interengaging over the corrugations or teeth of the key seat 3 will also assist in retaining the key in position within the nut. When the key 7 is forced home, the tip 9 thereof will spring outwardly into the notch 5 at the inner end of the respective keyway 4, so as to hold the key in its final position, assisted by the tension of the key itself, and by the corrugations of the key and key seat. It will be apparent that when the key is inserted, the tip 9 thereof will follow the respective groove or keyway 4 so as to properly lead the key through the registering key seat and keyway. After the key has been forced home, the coil 10 will seat against the face of the nut and the retaining finger 11 may be readily swung over the respective side of the nut during the insertion of the key, in order that the tip 12 of the retaining finger may be engaged with the corresponding recess 6 to maintain the coil 10 in position, and to thereby assist in the retention of the key within the nut.

The key may be readily extracted or withdrawn, by releasing the retaining finger 11, which will enable the key to be withdrawn from the key seat and registering keyway. It will be observed that as the key is inserted into or withdrawn from the key seat and respective keyway, the coil 10 will rotate or swing slightly about the bolt. Thus, to displace the key, it is not only necessary to draw the same longitudinally, but it is also necessary to turn the same slightly about the axis of the bolt along a spiral path.

In the variation illustrated in Figs. 7, 8 and 9, the bolt 1' and the nut 2' are provided with the key seat and keyways precisely the same as in the form above described, the key seat of the bolt being designated by the numeral 3'. The nut 2' however, is devoid of the notches or recesses 6 above described.

The modified form of locking device embodies two elements viz., a key and a key retaining clamp. Each of these elements is bent from a suitable length of resilient or flexible wire. Thus, the key 7' is straight, and has the corrugations 8' and angular flexible tip 9' similar to the key above described. The wire is bent back or reflexed from the butt end of the key 7', as at 7$^a$, and the terminal of the reflexed portion 7$^a$ is bent outwardly into an eye 7$^b$.

The key retaining clamp embodies the wire ring 10' which is provided at one side with an eye 10$^a$, and which is split at the opposite side, the terminals of the wire being overlapped and bent angularly, as at 10$^b$ opposite the eye 10$^a$, in order that when the terminals 10$^b$ are pressed together, the ring or loop 10' will be expanded, the sections or halves of the ring 10' normally having a tension tending to move them together.

In assembling the key 7' and the key retaining clamp, the key 7' is disposed within the ring 10' adjoining the eye 10$^a$, and the eye 7$^b$ of the key is engaged over the crossing portions between the ring 10' and the eye 10$^a$. Thus, the key 7' and the key retaining clamp are flexibly connected, in order that the key 7' may be inserted into the key seat of the bolt and the registering keyway of the nut in the manner above described, the ring 10' embracing the bolt beyond the face of the nut. When the key 7' is forced home, the clamping ring 10' will tightly embrace the bolt so as to give an inward tension to the reflexed portion 7$^a$ of the key, and consequently the key will be held snugly within the key seat, the sections of the clamping ring 10' also engaging the thread convolutions or the valleys of the thread, to assist in retaining the key in position. To extract the key, the clamping ring 10' may be expanded, by pressing the terminals or finger pieces 10$^b$ together, in order that the key may be readily withdrawn, as will be apparent from the foregoing.

Having thus described the invention, what is claimed as new is:—

1. In combination, a bolt having a spiral groove, a nut threaded upon the bolt and having spiral grooves adapted to register with the aforesaid groove, and a flexible key insertible into the registering grooves.

2. A nut lock embodying a key having an eye at one end, and a split clamping ring having an eye opposite the split and engaging the aforesaid eye.

3. A nut lock embodying a key having a reflexed portion at one end, the said reflexed portion having an eye, and a split clamping ring having an eye opposite the split and engaging the aforesaid eye.

4. A nut lock embodying a key having a reflexed portion at one end, and a bolt clamping member engaged to the said reflexed portion, the key being disposed within the clamping member.

In testimony that I claim the foregoing as my own, I have hereto affixed my signature in the presence of two witnesses.

ALVIN C. STOPP.

Witnesses:
 W. C. ROBINSON,
 LOUIS MASLEY.

Copies of this patent may be obtained for five cents each, by addressing the "Commissioner of Patents, Washington, D. C."